(12) United States Patent
Shi et al.

(10) Patent No.: US 9,854,934 B2
(45) Date of Patent: Jan. 2, 2018

(54) BREWING STRUCTURE OF CAPSULE COFFEE MACHINE

(71) Applicant: Junda Shi, Yuyao, Zhejiang (CN)

(72) Inventors: Junda Shi, Zhejiang (CN); Zhongyu Shi, Zhejiang (CN); Shukuo Liu, Zhejiang (CN); Yue Luo, Zhejiang (CN)

(73) Assignee: Ningbo Jinyu Electrical Appliance Co., Ltd., Yuyao, Zhejiang Province (CN)

( * ) Notice: Subject to any disclaimer, the term of this patent is extended or adjusted under 35 U.S.C. 154(b) by 69 days.

(21) Appl. No.: 15/172,103

(22) Filed: Jun. 2, 2016

(65) Prior Publication Data

US 2016/0278570 A1  Sep. 29, 2016

(30) Foreign Application Priority Data

Apr. 6, 2016  (CN) .......................... 2016 1 0208573

(51) Int. Cl.
| | |
|---|---|
| *A47J 31/40* | (2006.01) |
| *A47J 31/36* | (2006.01) |
| *A47J 31/58* | (2006.01) |
| *A47J 31/44* | (2006.01) |

(52) U.S. Cl.
CPC ....... *A47J 31/3628* (2013.01); *A47J 31/3695* (2013.01); *A47J 31/58* (2013.01); *A47J 31/3676* (2013.01); *A47J 31/4407* (2013.01)

(58) Field of Classification Search
CPC . A47J 31/3676; A47J 31/3695; A47J 31/3628
USPC .................................... 99/295, 302 P, 289 R
See application file for complete search history.

(56) References Cited

U.S. PATENT DOCUMENTS

| | | | | |
|---|---|---|---|---|
| 7,856,920 | B2* | 12/2010 | Schmed | A47J 31/0673 99/289 R |
| 2011/0308399 | A1* | 12/2011 | Jung | A47J 31/0668 99/295 |
| 2013/0068109 | A1* | 3/2013 | Pribus | A47J 31/407 99/295 |
| 2013/0186282 | A1* | 7/2013 | Guo | A47J 31/3638 99/295 |
| 2015/0201789 | A1* | 7/2015 | Smith | A47J 31/407 99/295 |
| 2015/0201791 | A1* | 7/2015 | Tinkler | B65D 85/8043 426/431 |
| 2015/0327717 | A1* | 11/2015 | Burrows | A23F 3/18 99/295 |
| 2016/0157666 | A1* | 6/2016 | Brandsma | A47J 31/407 99/295 |

* cited by examiner

*Primary Examiner* — Reginald L Alexander

(57) ABSTRACT

A brewing structure of a capsule coffee machine includes: a body which comprises a water tank and a capsule chamber, wherein a coffee outlet is provided at the capsule chamber; a capsule holder is provided in the capsule chamber; a pump and a heater is provided in the body; the body is hinged with an upper lid; a top piercing mechanism is provided on the upper lid, wherein the top piercing mechanism includes a top piercing tube; a water returner is formed between the capsule holder and the capsule chamber; the capsule holder has a water passage; a bottom piercing mechanism is mounted inside the water passage; a safety valve is mounted inside the body, which is controlled by movements of the top piercing mechanism, for cutting off the brewing water when the upper lid is opened, so as to prevent splashing hot water.

10 Claims, 12 Drawing Sheets

BREWING STRUCTURE OF CAPSULE COFFEE MACHINE

CROSS REFERENCE OF RELATED APPLICATION

The present invention claims priority under 35 U.S.C. 119(a-d) to CN 2016102085732, filed Apr. 6, 2016.

BACKGROUND OF THE PRESENT INVENTION

Field of Invention

The present invention relates to a technical field of coffee machine design, and more particularly to a capsule coffee machine using coffee capsules to brewing coffee. Specifically, the present invention relates to a brewing structure of a capsule coffee machine.

Description of Related Arts

Coffee can promote metabolism as well as active digestive organs, and has effects such as antioxidant, protecting heart, strengthening bones, caring waist and knee, promoting appetite, reducing fat, promoting defecation, promoting blood circulation, and relieving spasm. Studies have shown that drinking 100-200 mg of caffeine per day is enough for refreshing, which is harmless to the body. Capsule coffee machine is a new type of coffee machine developed in recent years. According to the so-called capsule coffee machine, a plastic capsule is pre-loaded with coffee powder by the manufacture, and then the plastic capsule is filled with nitrogen for preservation. When coffee is wanted, a user should just put the capsule into the capsule coffee machine, and then a cup of fragrant coffee will be available in no time. The capsule coffee machine enables a simple and convenient operation of coffee extraction. During operating, the coffee capsule is placed into a capsule room, and then coffee extraction begins by pressing one key. However, conventional capsule coffee machines are complicated in structure, and manufacturing costs thereof are relatively high. Furthermore, when a lid of the conventional capsule coffee machine is open, hot water is easy to be splashed out of the machine and harms the user due to a water pipe is detached from a water input.

SUMMARY OF THE PRESENT INVENTION

For solve the above technical defects, an object of the present invention is to provide a brewing structure of a capsule coffee machine with a computer-controlled one-key coffee extraction function, which is able to manually adjust a water temperature and coffee concentration according to coffee drinking requirements, and prevent splashing hot water.

Accordingly, in order to accomplish the above object, the present invention provides a brewing structure of a capsule coffee machine, comprising: a body which comprises a water tank and a capsule chamber, wherein a coffee outlet is provided at a bottom center of the capsule chamber; a capsule holder for containing a coffee capsule is provided in the capsule chamber; a pump is provided in the body for transporting brewing water in the water tank, and a heater is provided in the body for boiling the brewing water from the pump; the body is hinged with an upper lid corresponding to the capsule chamber; a top piercing mechanism is provided on the upper lid, wherein the top piercing mechanism comprises a top piercing tube for piercing a top portion of the coffee capsule and outputting the brewing water; a water returner communicating with the coffee outlet is formed between the capsule holder and the capsule chamber; a bottom center of the capsule holder has a water passage coaxially communicating with the coffee outlet; a bottom piercing mechanism, which comprises an elastic structure, for piercing a bottom portion of the coffee capsule and outputting brewed coffee is mounted inside the water passage; a safety valve is mounted inside the body, which is controlled by movements of the top piercing mechanism, for cutting off the brewing water when the upper lid is opened, so as to prevent splashing hot water; a coffee cup corresponding to the body is externally provided; the body further comprises a computer board for controlling the capsule coffee machine; a control panel is mounted on a top face of the upper lid, which communicates with the computer board, wherein the control panel comprises control buttons in a touch form and a digital displayer for displaying a working state and an output temperature of the brewing water.

Preferably, the present invention is embodied as follows.

The body further comprises an upper body, a lower body and a lower lid corresponding to each other; wherein the upper body is formed by an upper frame which is longitudinally placed and a brewing portion which is placed at a front end face of a middle-top portion of the upper frame and extends forwards; the water tank is formed by an inner chamber of the upper frame; the capsule chamber is formed by an inner chamber of the brewing portion; the lower body is formed by a lower frame which is placed at a top face of a longitudinal structure and installed on the upper body, and formed by a bottom holder extending forwards at a bottom portion of the lower frame; the lower lid is corresponding to a bottom opening of the bottom holder; the bottom holder extending forwards forms a holder for placing the coffee cup; a chamber is formed by the bottom holder and the brewing portion whose front end extends forwards, for containing the coffee cup.

The top piercing mechanism further comprises a piercing driving gland, a gland resetting spring, a piercing rotating frame and a piercing tube fixing board corresponding to each other; wherein the top piercing tube passes through and mounted on the piercing tube fixing board; a rotary lever, which is hinged to the safety valve, is provided on the piercing rotating frame; a water inputting pusher is mounted on the rotary lever, which is hollow and transports the brewing water; a silicone soft tube is connected between the water inputting pusher and the top piercing tube; a bar is mounted on the upper lid, which drives the whole top piercing mechanism to rotate with a rotating shaft formed by a hinge shaft of the rotary lever and the safety valve by pulling the piercing rotating frame; the water inputting pusher pushes the safety valve for activating a brewing water passage between the heater and the water inputting pusher while the upper lid presses downwards for driving the top piercing mechanism to pierce through the top portion of the coffee capsule and reaches a desired position by cooperating with the capsule chamber.

The safety valve comprises a safety valve body sealed and mounted on a top opening of the water tank, and a safety valve cap in the water tank for forming a valve chamber with the safety valve body; wherein a valve core is placed inside the valve chamber, which is pushed when the water inputting pusher presses downwards, wherein the valve core comprises a movable rod, a movable rod sealing ring, and a movable rod spring corresponding to each other; a safety valve sealing ring is press-mounted between the safety valve body and the safety valve cap; a water inlet and a water outlet, both of which communicate with the valve chamber, are respectively provided on the safety valve body; the safety valve cap has a water returning opening communicating with the valve chamber; a loop sealing ring is mounted in a loop slot of the water outlet for preventing brewing water leakage when the water inputting pusher presses downwards and communicates with the water outlet; the water inlet is connected to an outlet of the heater through a water inputting pipe; the water returning opening communicates with the water returner through a water returning pipe.

An upper portion and a lower portion of the movable rod respectively cooperate with the water outlet and the water returning opening in a guiding-sliding form; the movable rod sealing ring and the movable rod spring are sleeved on the movable rod in sequence; the water inputting pusher cooperates with a top face of the movable rod when pressing downwards; the movable rod sealing ring seals the water returning opening when the movable rod slides downwards for opening a passage between the water inlet and the water outlet; a top sealing ring is integrated on the movable rod, which seals the water outlet by the movable rod spring for preventing splashing the hot water when the upper lid drives the water inputting pusher to detach from the movable rod during opening; a connecting convex column hinged to the rotary lever is provided on the safety valve body.

The bottom piercing mechanism comprises a bottom piercing tube and a piercing tube spring; wherein the piercing tube spring is mounted in the water passage, the bottom piercing tube is placed at a top end of the piercing tube spring; a piercing rubber ring is placed on the top piercing tube for sealing around a pierced hole of the coffee capsule when the top piercing tube pierces through the coffee capsule.

The lower frame forms a longitudinal assembly chamber; both the pump and the heater are mounted in the longitudinal assembly chamber; a check valve is provided in a communication space between the water tank and the pump for preventing the brewing water from flowing backwards; the computer board is mounted in a horizontal assembly chamber between the lower lid and the bottom holder; a power cable of the computer board extends outwards through a rear end of the lower body; a temperature controller communicating with the computer board is mounted on the heater for feeding back and adjusting a heating temperature of the heater; the computer board programs the heating temperature of the heater and a brewing water amount of the pump.

A bottom water level controller is provided in the water tank for stopping the heater when a water level in the water tank is lower than a pre-set value; an electronic signal of the bottom water level controller feeds back water level information of the water tank to the computer board; a buzzer is provided on the upper lid for indicating when coffee brewing is completed or the water level is lower than the pre-set value; a lid button, comprising a button locker and a locker spring, is mounted on the upper lid.

The control buttons comprises a start/stop button, a function button, and an adjust button which comprises an adding button and a decreasing button; wherein the function button switches between a water output adjusting function and a water temperature adjusting function, the adjust button adjusts the brewing water amount outputted by the pump for each cup of coffee under the water output adjusting function by changing control parameters of the computer board according to a coffee powder amount in the coffee capsule; the adjust button adjusts a water output temperature of the heater under the water temperature adjusting function through the computer board.

The control panel is mounted in a top lid chamber, whose opening faces upwards, of the upper lid; a heat isolator is mounted under the control panel; a sticker with button function indicators is placed on the top lid chamber for corresponding to the control panel; a power indicator is mounted in the upper lid.

Compared with conventional technologies, the safety valve is mounted inside the body of the present invention, which is controlled by movements of the top piercing mechanism, for cutting off the brewing water when the upper lid is opened, so as to prevent splashing hot water. Therefore, a problem that when a lid of the conventional capsule coffee machine is open, hot water is splashed out of the machine and harms the user due to a water inputting pusher is detached from a safety valve. According to the present invention, the water returner communicating with the coffee outlet is formed between the capsule holder and the capsule chamber, so as to ensure that heated brewing water enters the water returner through the safety valve when the water outlet is closed by the safety valve. The body of the present invention further comprises the computer board for programming the capsule coffee machine; the control panel is mounted on a top face of the upper lid, which communicates with the computer board, wherein the control panel comprises control buttons in a touch form and a digital displayer for displaying a working state and an output temperature of the brewing water. According to the present invention, a working period of the pump is manually controllable according to the coffee powder amount in the coffee capsule through the computer board with the control buttons, for adjusting the brewing water amount for brewing the coffee, so as to meets requirements of coffee with different concentrations. Meanwhile, users are able to adjust the water output temperature of the brewing water through the control buttons. The heater of the present invention is U-shaped, which is conducive to product miniaturization. The top piercing tube is hollow, which is able to directly extract the coffee in the coffee capsule after piercing through the coffee capsule, thus being healthier. According to the present invention, the structure is novel, operations are simple, one-key coffee extraction is possible, splashing hot water is avoided, and the water temperatures as well as the coffee concentrations are adjustable.

These and other objectives, features, and advantages of the present invention will become apparent from the following detailed description, the accompanying drawings, and the appended claims.

DETAILED DESCRIPTION OF THE PREFERRED EMBODIMENT

Figure 1:
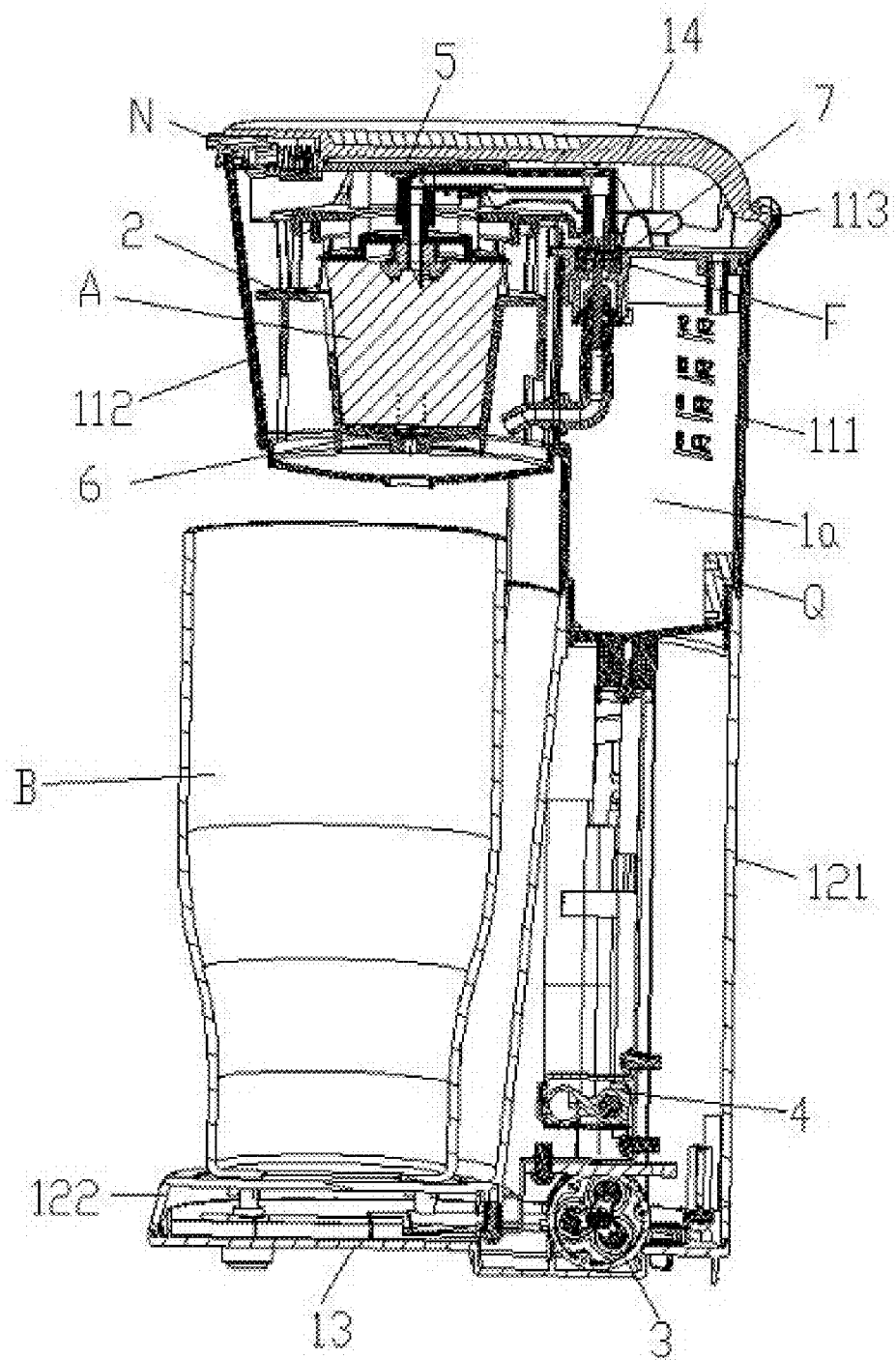
FIG. 1 is a side sectional view of a preferred embodiment according to the present invention.

Referring to drawings, a preferred embodiment of the present invention is further illustrated.

FIGS. 1-12 are sketch views of the present invention.

Element reference: coffee capsule A, coffee cup B, chamber C, power indicator D, loop sealing ring F, water returning pipe H, water returner K, buzzer M, lid button N, button locker N1, locker spring N2, bottom water level controller Q, water inputting pipe S, silicone soft tube R, pressing board Y, check valve Z, body 1, water tank 1a, capsule 1b, coffee outlet 1c, upper body 11, upper frame 111, brewing portion 112, lower body 12, hinge flange 113, lower frame 121, bottom holder 122, lower lid 13, upper lid 14, top lid chamber 14a, bar 141, sticker 15, capsule holder 2, water passage 2a, pump 3, heater 4, temperature controller 41, top piercing mechanism 5, piercing driving gland 51, connecting rod 511, gland resetting spring 52, piercing rotating frame 53, rotary lever 531, water inputting pusher 532, sliding hole 533, bar button 534, piercing tube fixing board 54, guiding sliding columns 541, top piercing tube 55, piercing rubber ring 56, bottom piercing mechanism 6, bottom piercing tube 61, piercing tube spring 62, safety valve 7, water inlet 7a, water outlet 7b, water returning opening 7c, safety valve body 71, connecting convex column 711, safety valve cap 72, movable rod 73, top sealing ring 731, movable rod sealing ring 74, movable rod spring 75, safety valve sealing ring 76, computer board 8, control panel 9, control buttons 91, digital displayer 92.

Figure 2:
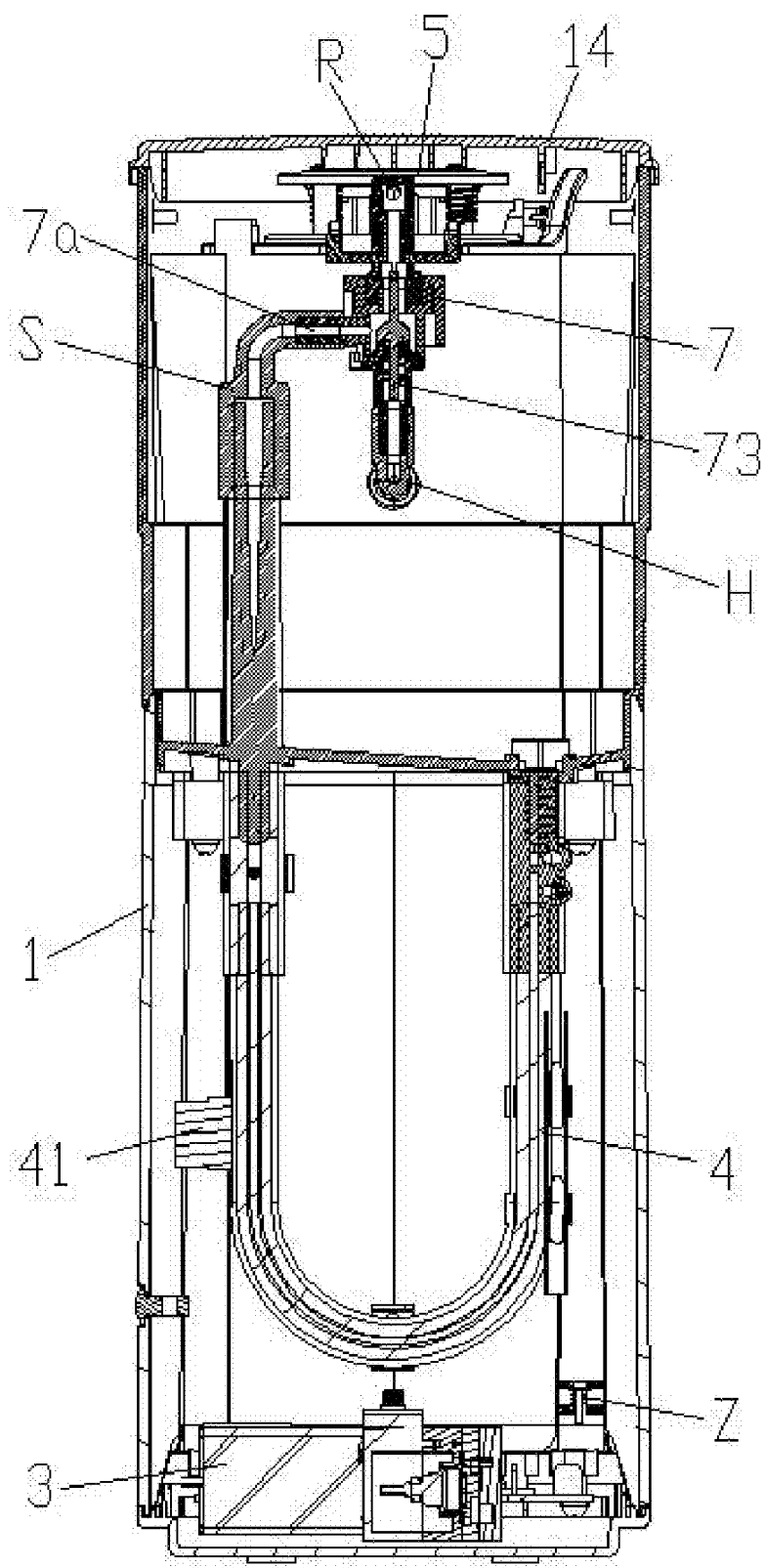
FIG. 2 is a rear sectional view of the present invention.
Figure 3:
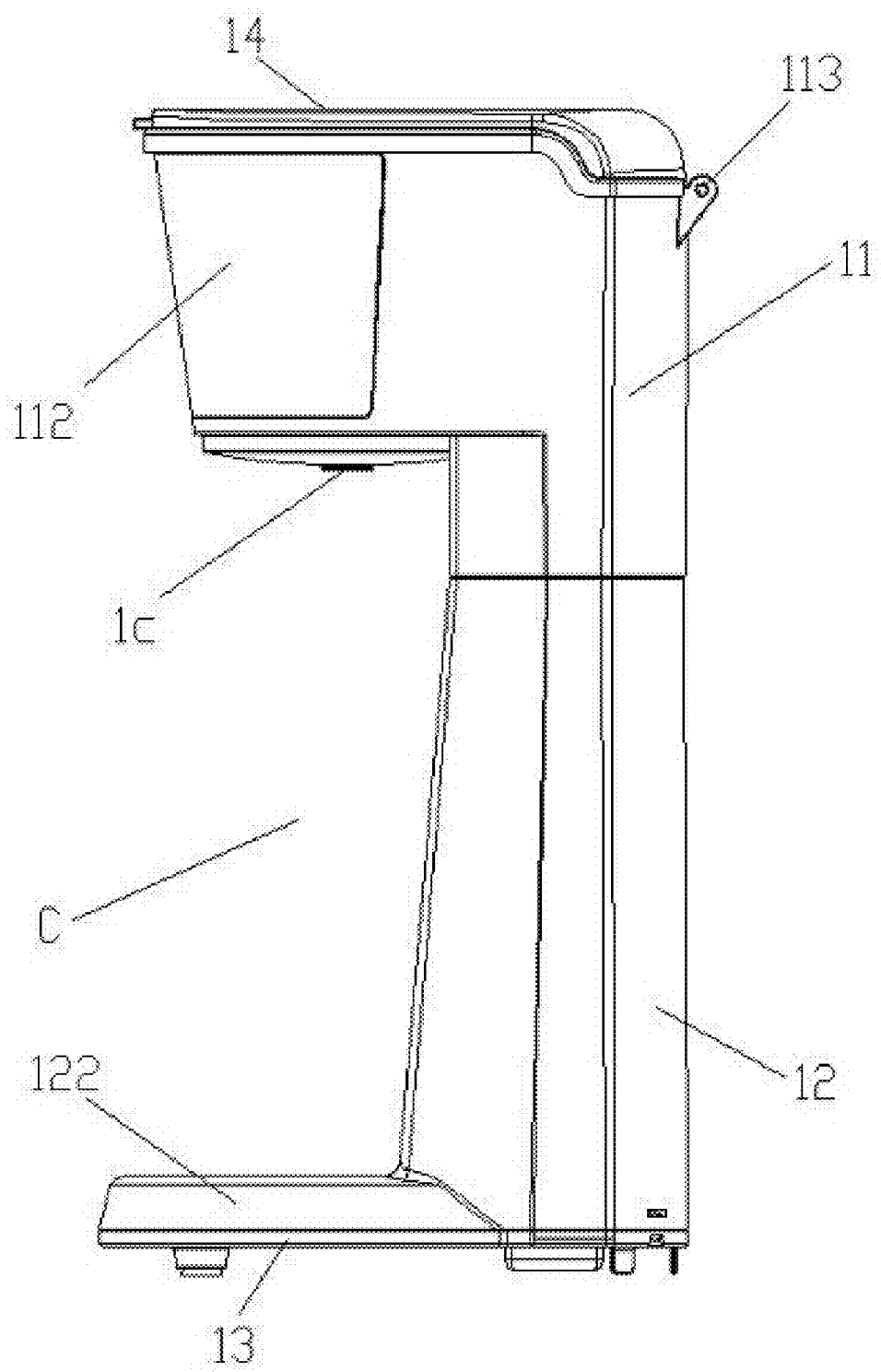
FIG. 3 is a right view of the present invention without a coffee cup.
Figure 4:
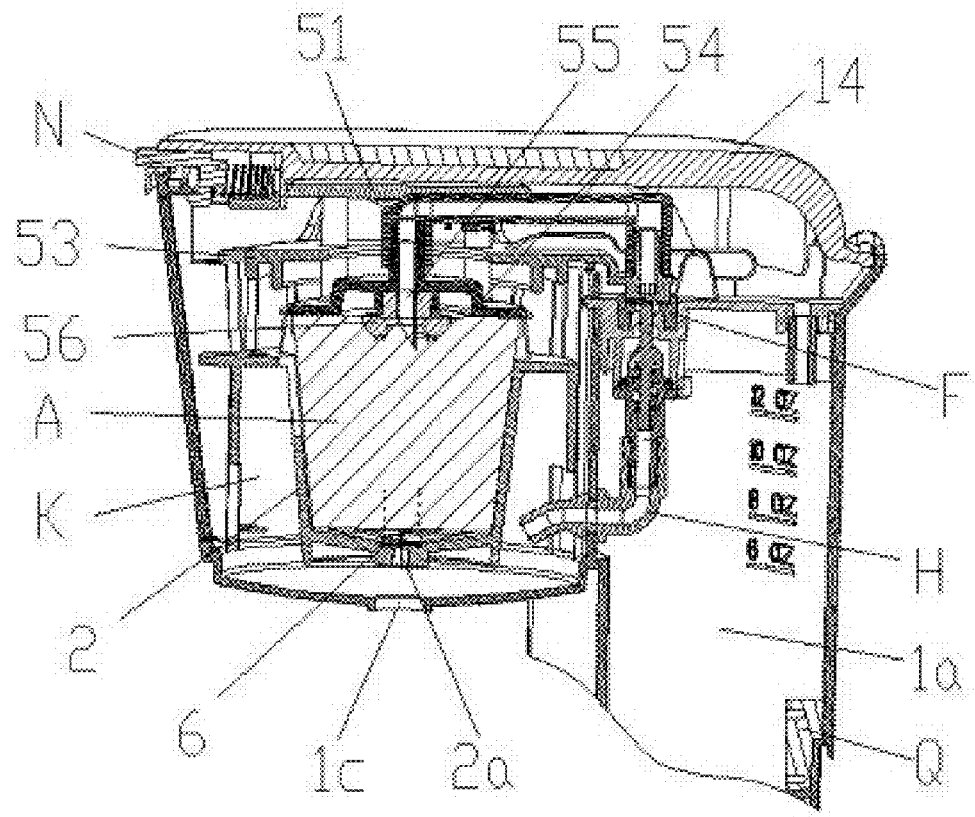
FIG. 4 is a sectional view of a brewing portion in FIG. 1.
Figure 5:
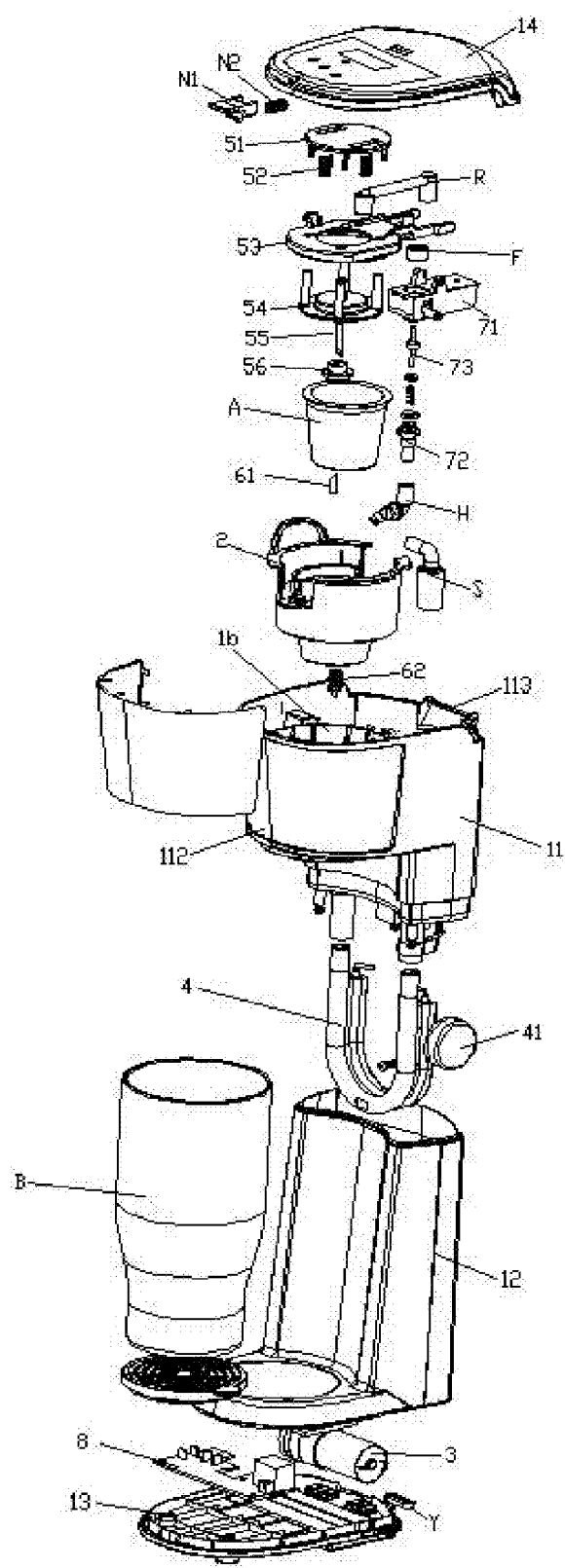
FIG. 5 is an exploded view of the present invention.
Figure 6:
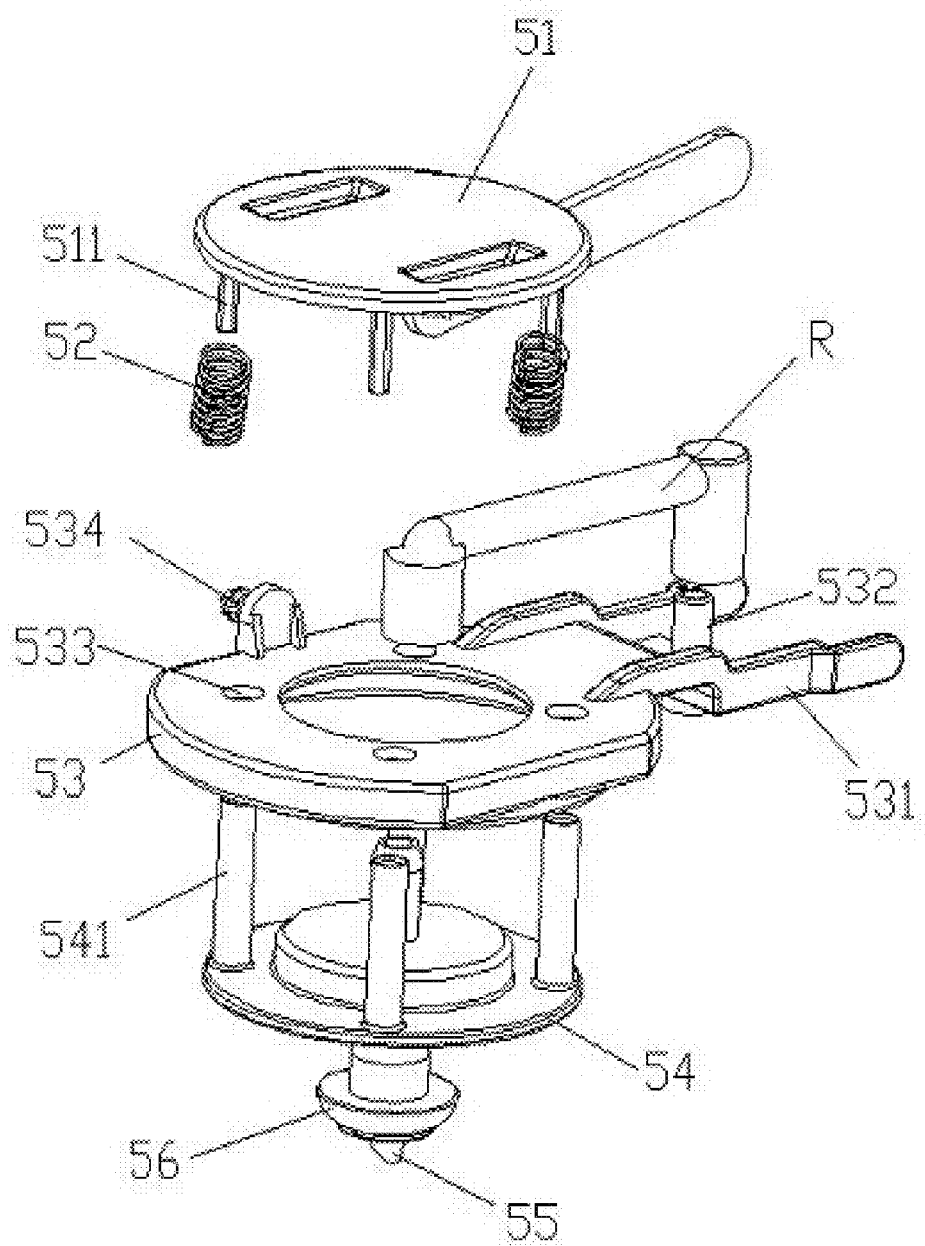
FIG. 6 is an exploded view of a top piercing mechanism in FIG. 1.

Referring to FIGS. 1-12, a brewing structure of a capsule coffee machine comprises: a body 1 which comprises a water tank 1a and a capsule chamber 1b. Referring to FIGS. 1-8, the body 1 further comprises an upper body 11, a lower body 12 and a lower lid 13 corresponding to each other; wherein the upper body 11 is formed by an upper frame 111 which is longitudinally placed and a brewing portion 112 which is placed at a front end face of a middle-top portion of the upper frame 111 and extends forwards; the water tank 1a is formed by an inner chamber extending forwards of the upper frame 111; the capsule chamber 1b is formed by an inner chamber, whose opening faces upwards, of the brewing portion 112; the lower body 12 is formed by a lower frame 121 with a longitudinal structure and a bottom holder 122 extending forwards at a bottom portion of the lower frame 121; a top of the lower frame 121 is corresponding to and inserted into a bottom of the upper body 11. The bottom holder 122 has a bottom opening, the lower lid 13 is corresponding to the bottom opening of the bottom holder 122; a coffee cup B corresponding to the body 1 is externally provided; the bottom holder 122 extending forwards forms a holder for placing the coffee cup B. Referring to FIG. 3, a chamber C of the body 1, which is concave, is formed by the bottom holder 122, which extends forwards after the upper body 11 and the lower body 12 are assembled, and the brewing portion 112 whose front end extends forwards, for containing the coffee cup B, in such a manner that the present invention has a structure with overall aesthetic.

According to the present invention, a coffee outlet 1c is provided at a bottom center of the capsule chamber 1b for outputting brewed coffee, and directs to the coffee cup B placed on the bottom holder 122; a capsule holder 2 is placed in the capsule camber 1b for containing a coffee capsule A for brewing coffee. A bottom center of the capsule holder 2 has a water passage 2a coaxially communicating with the coffee outlet 1c; a bottom piercing mechanism 6, which comprises an elastic structure, for piercing a bottom portion of the coffee capsule A and outputting brewed coffee is mounted inside the water passage 2a; a safety valve 7 is mounted inside the body 1, which is controlled by movements of the top piercing mechanism 5, for cutting off the brewing water when the upper lid 14 is opened, so as to prevent splashing hot water; a pump 3 is provided in the body 1 for transporting brewing water in the water tank 1a, and a heater 4 is provided in the body 1 for boiling the brewing water from the pump 3. The body 1 further comprises a computer board 8 for controlling the capsule coffee machine; a control panel 9 is mounted on a top face of the upper lid 14, which communicates with the computer board 8, wherein the control panel 9 comprises control buttons 91 in a touch form and a digital displayer 92 for displaying a working state and an output temperature of the brewing water.

The heater 4 of the present invention is U-shaped, which minimizes space occupation inside the capsule coffee machine, so as to be conducive to coffee machine minimization. Both the pump 3 and the heater 4 are mounted in a longitudinal assembly chamber formed by the lower frame 121, and the heater 4 is above the pump 3; for preventing returning boiled brewing water after the pump 3 stops, a check valve Z is provided in a communication space between the water tank 1a and the pump 3. A horizontal assembly chamber is formed between the lower lid 13 and the bottom holder 122, the computer board 8 is mounted in the horizontal assembly chamber between the lower lid 13 and the bottom holder 122, and a power cable of the computer board 8 extends outwards through a rear end of the lower body 12; for preventing the power cable from being pulled out or falling, a pressing board Y for tightening the power cable is provided on the lower lid 13. A temperature controller 41 communicating with the computer board 8 is mounted on the heater 4 for feeding back and adjusting a heating temperature of the heater 4; the computer board 8 programs the heating temperature of the heater 4 and a brewing water amount of the pump 3.

Figure 10:
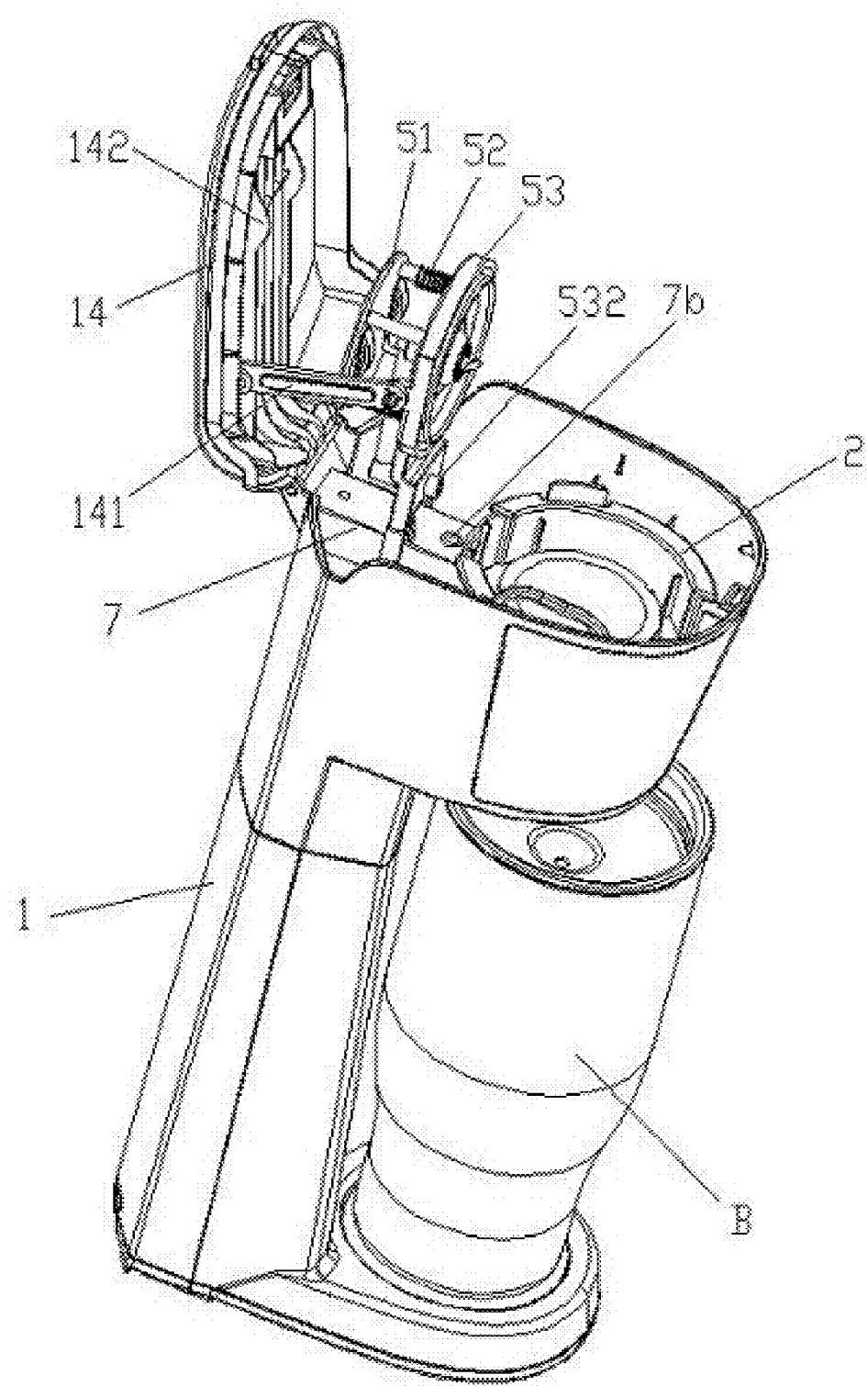
FIG. 10 is a perspective view of the present invention.
Figure 11:
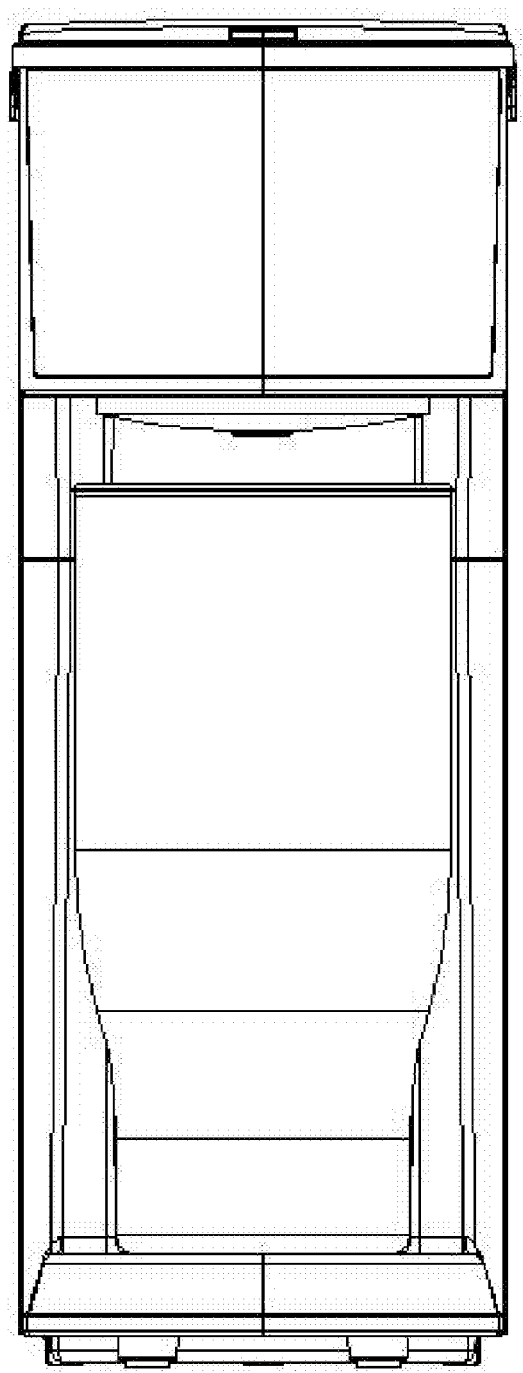
FIG. 11 is a front view of the present invention.
Figure 12:
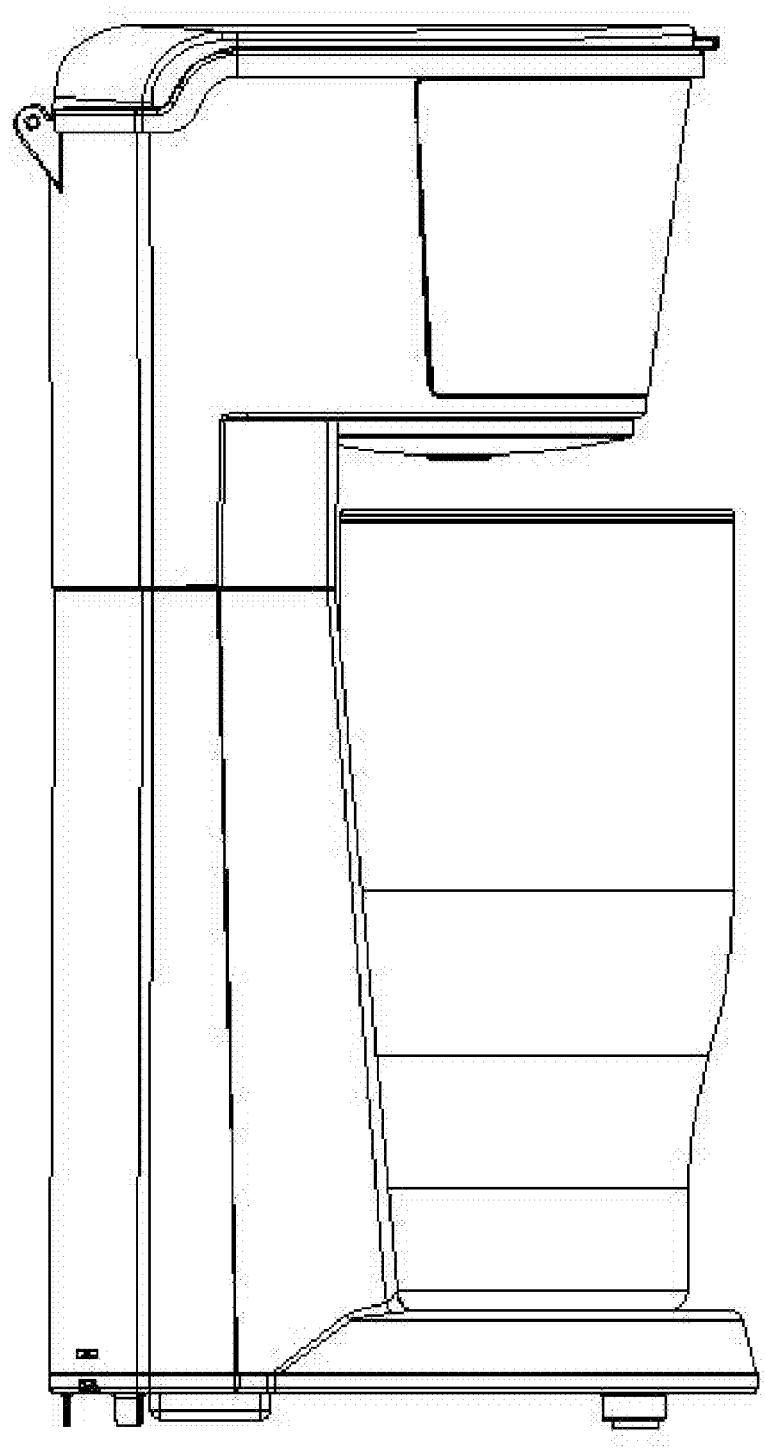
FIG. 12 is a left view of FIG. 11.

The body 1 is hinged with the upper lid 14 corresponding to the capsule chamber 1b. Referring to FIGS. 1-3, a hinge flange 113 hinged with the upper lid 14 is provided on a rear portion of a top end of the upper body 11, and the upper lid 14 rotates to open or close with the hinge flange 113 as a shaft, wherein the upper lid 14 drives the top piercing mechanism 5 when opening or closing, and the top piercing mechanism comprises a top piercing tube 55 for piercing a top portion of the coffee capsule A and outputting the brewing water. The whole top piercing mechanism 5 is formed by a piercing driving gland 51, a gland resetting spring 52, a piercing rotating frame 53, a piercing tube fixing board 54 and the top piercing tube 55. The top piercing tube 55 longitudinally passes through and mounted in a hole of the piercing tube fixing board 54; four guiding sliding columns 541 are provided on the piercing tube fixing board 54, wherein the guiding sliding columns 541 slides through a sliding hole 533 on the piercing rotating frame 53, in such a manner that the piercing tube fixing board 54 slides up and down related to the piercing rotating frame 53 within a certain range; a center of each of the guiding sliding columns 541 has a longitudinal connecting hole, and a connecting rod 511 cooperating with the connecting hole is provided on the piercing driving gland 51; the gland resetting spring 52 is sleeved on the guiding sliding columns 541, a bottom end of the gland resetting spring 52 presses against a top circumference surface of the sliding hole 533 of the piercing rotating frame 53, and a top end of the gland resetting spring 52 is connected to a top of the piercing driving gland 51; a rotary lever 531, which is hinged to the safety valve 7, is provided on the piercing rotating frame 53; a water inputting pusher 532 is mounted on the rotary lever 531, which is hollow and transports the brewing water; a silicone soft tube R is connected between the water inputting pusher 532 and the top piercing tube 55; a bar button 534 is integrated at a side of the piercing rotating frame 53; a bar 141 is mounted on the upper lid 14, which drives the whole top piercing mechanism 5 to rotate with a rotating shaft formed by a hinge shaft of the rotary lever 531 and the safety valve 7 by pulling the piercing rotating frame 53. Referring to FIG. 10, the bar 141 is hinged with the bar button 534; the water inputting pusher 532 pushes the safety valve 7 for activating a brewing water passage between the heater 4 and the water inputting pusher 532 while the upper lid 14 presses downwards for driving the top piercing mechanism to pierce through the top portion of the coffee capsule A and reaches a desired position by cooperating with the capsule chamber 1b. Referring to FIG. 10, an arc presser 142 is provided at an inner end face of the upper lid 14 for pressing against the piercing driving gland 51. According to the present invention, before the upper lid 14 and the capsule chamber 1b reach desired positions, the piercing rotating frame 53 stops due to cooperating with the capsule holder 2 at first. At that time, the top piercing tube 55 is right perpendicular to the coffee capsule A. When the upper lid 14 continues to move downwards and the capsule chamber 1b is closed, the arc presser 142 downwardly pushes the piercing driving gland 51 for compacting the gland resetting spring 52 to drive the piercing tube fixing board 54, in such a manner that the top piercing tube 55 perpendicularly pierces through the coffee capsule A in the capsule holder 2.

According to the present invention, the safety valve 7 comprises a safety valve body 71 sealed and mounted on a top opening of the water tank 1a, and a safety valve cap 72 in the water tank 1a for forming a valve chamber with the safety valve body 71; wherein a valve core is placed inside the valve chamber, which is pushed when the water inputting pusher 532 presses downwards, wherein the valve core comprises a movable rod 73, a movable rod sealing ring 74, and a movable rod spring 75 corresponding to each other; a safety valve sealing ring 76 is press-mounted between the safety valve body 71 and the safety valve cap 72; a water inlet 7a and a water outlet 7b, both of which communicate with the valve chamber, are respectively provided on the safety valve body 71; the safety valve cap 72 has a water returning opening 7c communicating with the valve chamber; a loop sealing ring F is mounted in a loop slot of the water outlet 7b for preventing brewing water leakage when the water inputting pusher 532 presses downwards and communicates with the water outlet 7b; the water inlet 7a is connected to an outlet of the heater 4 through a water inputting pipe S; the water returning opening 7c communicates with the water returner K through a water returning pipe H.

Figure 7:
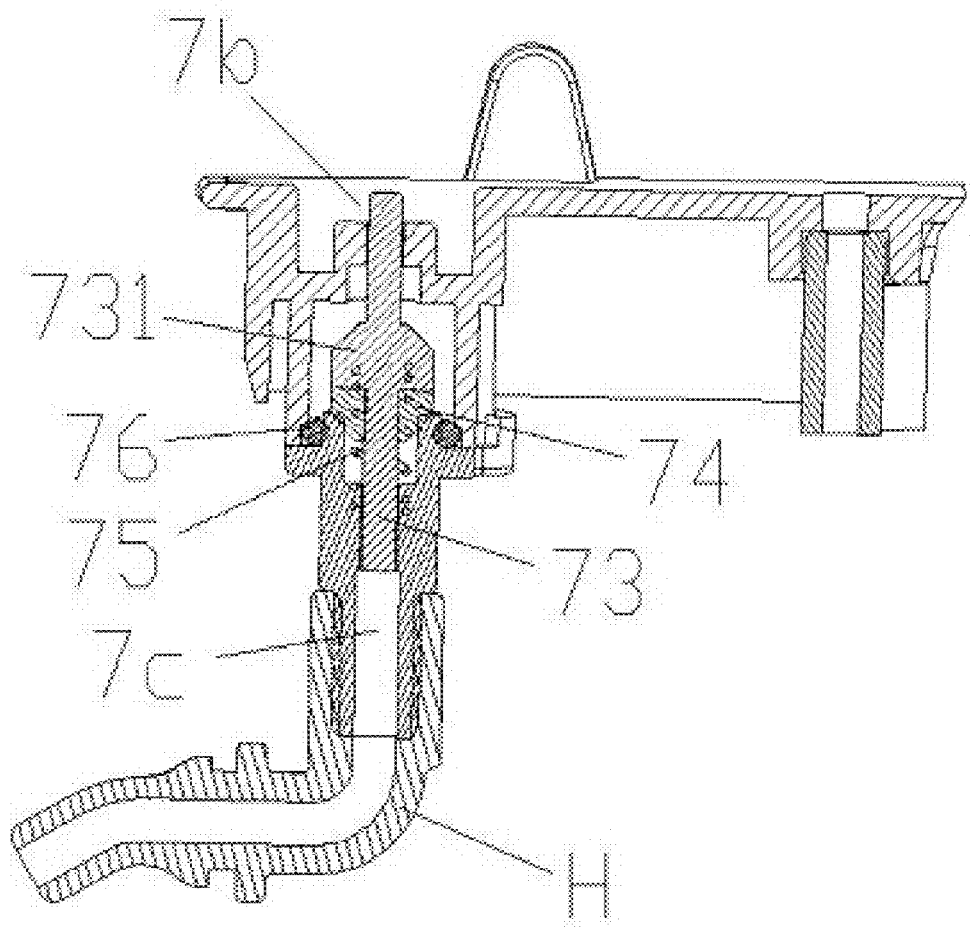
FIG. 7 is a sectional view of a safety valve in FIG. 1.
Figure 8:
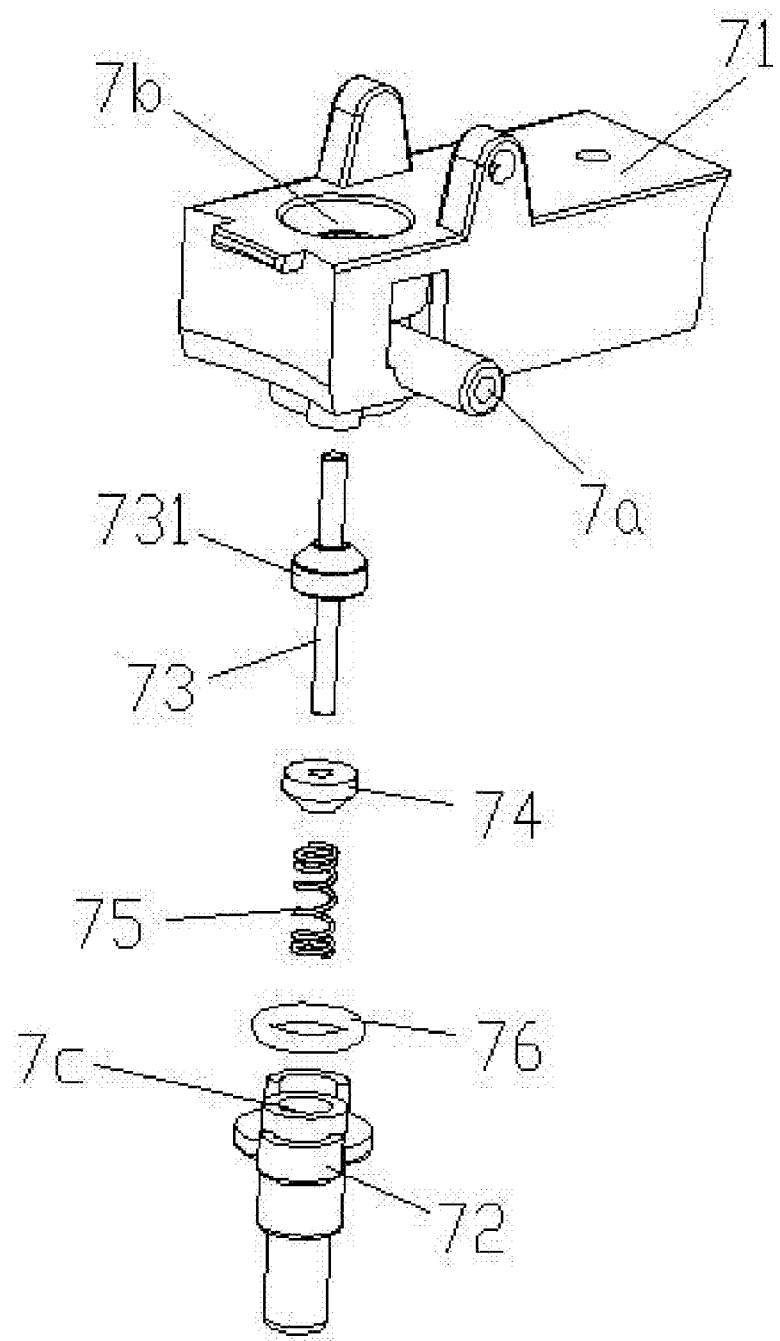
FIG. 8 is an exploded view of the safety valve according to the present invention.

Referring to FIG. 7, an upper portion and a lower portion of the movable rod 73 respectively cooperate with the water outlet 7b and the water returning opening 7c in a guiding-sliding form; the movable rod sealing ring 74 and the movable rod spring 75 are sleeved on the movable rod 73 in sequence; and a top sealing ring 731 is integrated on the movable rod 73 which seals the water outlet 7b. The water inputting pusher 532 cooperates with a top face of the movable rod 73 when pressing downwards; when the upper lid 14 rotates downwards and closes the capsule chamber 1b, the top piercing tube 55 perpendicularly pierces through the coffee capsule, wherein the water inputting pusher 532 downwardly presses the movable rod 73, so as to drive the movable rod sealing ring 74 to compact the movable rod spring 75 and slide downwards, in such a manner that the top sealing ring 731 is detached from the water outlet 7b and opens the passage between the water inlet 7a and the water outlet 7b. As a result, the brewing water enters the coffee capsule A through the water inputting pusher 532, the silicone soft tube R and the top piercing tube 55 in sequence. Meanwhile, the movable rod sealing ring 74 seals the water returning opening 7c due to the movable rod 73 moves downwards. According to the present invention, when coffee brewing is complete and the upper lid 14 opens upwards, the water inputting pusher 532 rotates upwards with the piercing rotating frame 53 and is detached from the movable rod 73, wherein a force applied on the movable rod 73 by the water inputting pusher 532 disappears, the movable rod 73 and the movable rod sealing ring 74 reset by an elastic force of the movable rod spring 75, and both the movable rod 73 and the movable rod sealing ring 74 move upwards, in such a manner that the top sealing ring 731 seals the water outlet 7b for avoid splashing hot water due to detaching the water inputting pusher 532 from the water outlet 7b, which ensures no hot water splashed during opening the upper lid 14. When the top sealing ring 731 seals the water outlet 7b, the movable rod sealing ring 74 moves upwards and is detached from the water returning opening 7c, so the passage between the water returning opening 7c and the water inlet 7a is opened for returning the hot water back to the water returner K through the water returning opening 7c. Referring to FIG. 8 of the present invention, two convex columns 711 are symmetrically provided at a right and a left of the safety valve body 71, and two rotary levers 531 are symmetrically provided at a right and a left of the piercing rotating frame 53, wherein the two convex columns 711 are respectively hinged to the two rotary levers 531.

According to the present invention, the bottom piercing mechanism 6 comprises a bottom piercing tube 61 and a piercing tube spring 62; wherein the piercing tube spring 62 is mounted in the water passage 2a, the bottom piercing tube 61 is placed at a top end of the piercing tube spring 62; a piercing rubber ring 56 is placed on the top piercing tube 55 for sealing around a pierced hole of the coffee capsule A when the top piercing tube 55 pierces through the coffee capsule A. The coffee capsule may be pressed by hand when putting into the capsule holder 2, in such a manner that the bottom piercing tube 61 pierces through the bottom of the coffee capsule A. As a result, when the top piercing tube 55 pierce through the top of the coffee capsule A, the brewing water enters the coffee capsule A through the top piercing tube 55, and the brewed coffee is outputted from the bottom piercing tube 61 through the water passage 2a and the coffee outlet 1c.

According to the preferred embodiment, a bottom water level controller Q is provided in the water tank 1a for stopping the heater 4 when a water level in the water tank 1a is lower than a pre-set value; an electronic signal of the bottom water level controller Q feeds back water level information of the water tank 1a to the computer board 8; a buzzer M is provided on the upper lid 14 for indicating when coffee brewing is completed or the water level is lower than the pre-set value; a lid button N, comprising a button locker N1 and a locker spring N2, is mounted on the upper lid 14. According to the present invention, the water tank 1a may comprises a window which is transparent for easily observing the water level, wherein a water tank content graduation is marked on the window from bottom to top.

Figure 9:
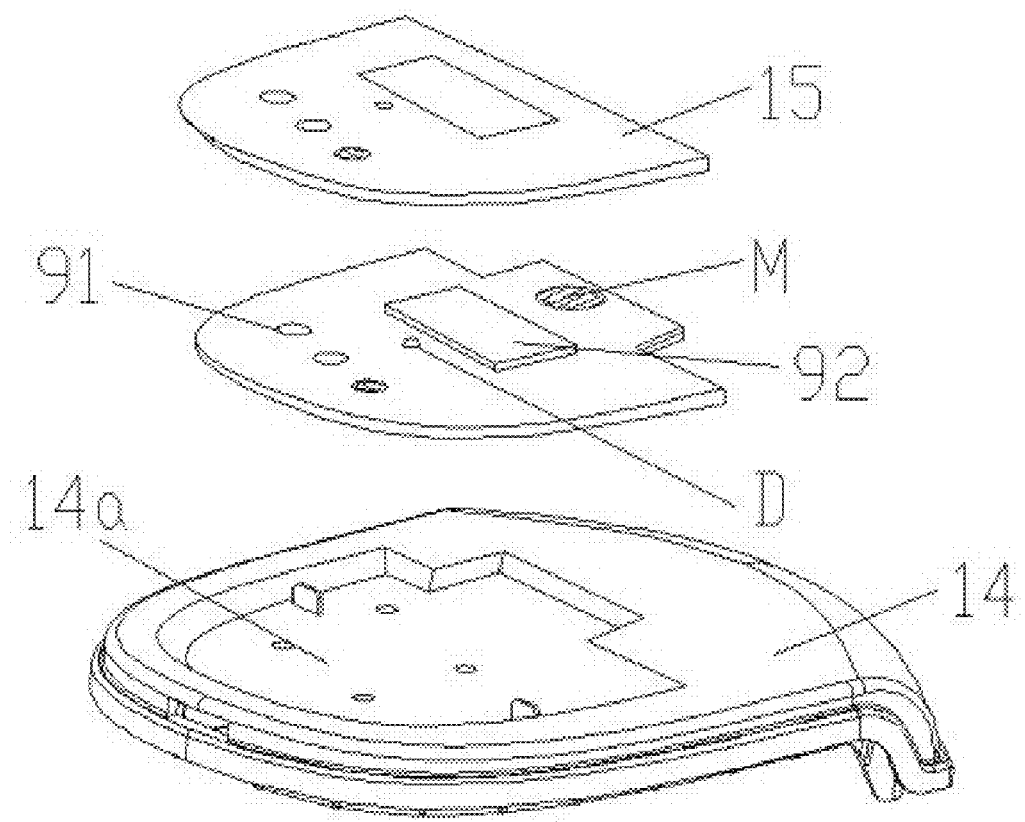
FIG. 9 is a sketch view of an upper lid.

Referring to FIG. 9, the control buttons 91 comprises a start/stop button, a function button, and an adjust button which comprises an adding button and a decreasing button. When the upper lid 14 is closed, a coffee brewing program is able to be started through the computer board 8 by directly pushing down the start/stop button, and the coffee brewing program, which is started by the computer board 8, is able to be canceled just by pressing the start/stop button again. During a whole operation process of the control buttons 91, the digital displayer 92 real-time displays a current operation, which informs the user about operation conditions for avoiding misoperation. When the computer board 8 starts the brewing program, a brewing time is displayed in a countdown form. For ensuring that the brewing water staying in the heater 4 is discharged before being heated after the pump 3 is activated, a start time of the pump 3 is later than a start time of the heater 4 with a delay of 1 s. According to the present invention, the heater 4 needs 1 s or 2 s for boiling the brewing water. The control panel 9 is mounted in a top lid chamber 14a, whose opening faces upwards, of the upper lid 14; a heat isolator is mounted under the control panel 9; a sticker 15 with button function indicators is placed on the top lid chamber 14a for corresponding to the control panel 9; a power indicator D is mounted in the upper lid 14. After the power cable is electrified, the power indicator D is red, which means a standby state; when coffee is brewed, the buzzer M starts and the power indicator D turns green.

According to the present invention, the function button switches between a water output adjusting function and a water temperature adjusting function, the adjust button adjusts the brewing water amount outputted by the pump 3 for each cup of coffee under the water output adjusting function by changing control parameters of the computer board 8 according to a coffee powder amount in the coffee capsule A, so as to change the concentration of brewed coffee; the adjust button adjusts a water output temperature of the heater 4 under the water temperature adjusting function through the computer board 8, wherein a preferred water output temperature is 95 degrees, and each cap of coffee is brewed for 20 s-25 s.

According to the present invention, a working period of the pump is manually controllable according to the coffee powder amount in the coffee capsule through the computer board with the control buttons, for adjusting the brewing water amount for brewing the coffee, so as to meets requirements of coffee with different concentrations. Meanwhile, users are able to adjust the water output temperature of the brewing water through the control buttons. A min working period of the pump 3 is 20 s while a max working period thereof is 25 s. The heater of the present invention is U-shaped, which is conducive to product miniaturization. The top piercing tube is hollow, which is able to directly extract the coffee in the coffee capsule after piercing through the coffee capsule, thus being healthier. According to the present invention, the structure is novel, operations are simple, one-key coffee extraction is possible, splashing hot water is avoided, and the water temperatures as well as the coffee concentrations are adjustable.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A brewing structure of a capsule coffee machine, comprising: a body (1) which comprises a water tank (1a) and a capsule chamber (1b), wherein a coffee outlet (1c) is provided at a bottom center of the capsule chamber (1b); a capsule holder (2) for containing a coffee capsule (A) is provided in the capsule chamber (1b); a pump (3) is provided in the body (1) for transporting brewing water in the water tank (1a), and a heater (4) is provided in the body (1) for boiling the brewing water from the pump (3); the body (1) is hinged with an upper lid (14) corresponding to the capsule chamber (1b); a top piercing mechanism (5) is provided on the upper lid (14), wherein the top piercing mechanism (5) comprises a top piercing tube (55) for piercing a top portion of the coffee capsule (A) and outputting the brewing water; a water returner (K) communicating with the coffee outlet (1c) is formed between the capsule holder (2) and the capsule chamber (1b); a bottom center of the capsule holder (2) has a water passage (2a) coaxially communicating with the coffee outlet (1c); a bottom piercing mechanism (6), which comprises an elastic structure, for piercing a bottom portion of the coffee capsule (A) and outputting brewed coffee is mounted inside the water passage (2a); a safety valve (7) is mounted inside the body (1), which is controlled by movements of the top piercing mechanism (5), for cutting off the brewing water when the upper lid (14) is opened, so as to prevent splashing hot water; a coffee cup (B) corresponding to the body (1) is externally provided; the body (1) further comprises a computer board (8) for controlling the capsule coffee machine; a control panel (9) is mounted on a top face of the upper lid (14), which communicates with the computer board (8), wherein the control panel (9) comprises control buttons (91) in a touch form and a digital displayer (92) for displaying a working state and an output temperature of the brewing water.

2. The brewing structure, as recited in claim 1, wherein the body (1) further comprises an upper body (11), a lower body (12) and a lower lid (13) corresponding to each other; wherein the upper body (11) is formed by an upper frame (111) which is longitudinally placed and a brewing portion (112) which is placed at a front end face of a middle-top portion of the upper frame (111) and extends forwards; the water tank (1a) is formed by an inner chamber of the upper frame (111); the capsule chamber (1b) is formed by an inner chamber of the brewing portion (112); the lower body (12) is formed by a lower frame (121) which is placed at a top face of a longitudinal structure and installed on the upper body (11), and formed by a bottom holder (122) extending forwards at a bottom portion of the lower frame (121); the lower lid (13) is corresponding to a bottom opening of the bottom holder (122); the bottom holder (122) extending forwards forms a holder for placing the coffee cup (B); a chamber (C) is formed by the bottom holder (122) and the brewing portion (112) whose front end extends forwards, for containing the coffee cup (B).

3. The brewing structure, as recited in claim 2, wherein the top piercing mechanism (5) further comprises a piercing driving gland (51), a gland resetting spring (52), a piercing rotating frame (53) and a piercing tube fixing board (54) corresponding to each other; wherein the top piercing tube (55) passes through and mounted on the piercing tube fixing board (54); a rotary lever (531), which is hinged to the safety valve (7), is provided on the piercing rotating frame (53); a water inputting pusher (532) is mounted on the rotary lever (531), which is hollow and transports the brewing water; a silicone soft tube (R) is connected between the water inputting pusher (532) and the top piercing tube (55); a bar (141) is mounted on the upper lid (14), which drives the whole top piercing mechanism (5) to rotate with a rotating shaft formed by a hinge shaft of the rotary lever (531) and the safety valve (7) by pulling the piercing rotating frame (53); the water inputting pusher (532) pushes the safety valve (7) for activating a brewing water passage between the heater (4) and the water inputting pusher (532) while the upper lid (14) presses downwards for driving the top piercing mechanism to pierce through the top portion of the coffee capsule (A) and reaches a desired position by cooperating with the capsule chamber (1*b*).

4. The brewing structure, as recited in claim 3, wherein the safety valve (7) comprises a safety valve body (71) sealed and mounted on a top opening of the water tank (1*a*), and a safety valve cap (72) in the water tank (1*a*) for forming a valve chamber with the safety valve body (71); wherein a valve core is placed inside the valve chamber, which is pushed when the water inputting pusher (532) presses downwards, wherein the valve core comprises a movable rod (73), a movable rod sealing ring (74), and a movable rod spring (75) corresponding to each other; a safety valve sealing ring (76) is press-mounted between the safety valve body (71) and the safety valve cap (72); a water inlet (7*a*) and a water outlet (7*b*), both of which communicate with the valve chamber, are respectively provided on the safety valve body (71); the safety valve cap (72) has a water returning opening (7*c*) communicating with the valve chamber; a loop sealing ring (F) is mounted in a loop slot of the water outlet (7*b*) for preventing brewing water leakage when the water inputting pusher (532) presses downwards and communicates with the water outlet (7*b*); the water inlet (7*a*) is connected to an outlet of the heater (4) through a water inputting pipe (S); the water returning opening (7*c*) communicates with the water returner (K) through a water returning pipe (H).

5. The brewing structure, as recited in claim 4, wherein an upper portion and a lower portion of the movable rod (73) respectively cooperate with the water outlet (7*b*) and the water returning opening (7*c*) in a guiding-sliding form; the movable rod sealing ring (74) and the movable rod spring (75) are sleeved on the movable rod (73) in sequence; the water inputting pusher (532) cooperates with a top face of the movable rod (73) when pressing downwards; the movable rod sealing ring (74) seals the water returning opening (7*c*) when the movable rod (73) slides downwards for opening a passage between the water inlet (7*a*) and the water outlet (7*b*); a top sealing ring (731) is integrated on the movable rod (73), which seals the water outlet (7*b*) by the movable rod spring (75) for preventing splashing the hot water when the upper lid (14) drives the water inputting pusher (532) to detach from the movable rod (73) during opening; a connecting convex column (711) hinged to the rotary lever (531) is provided on the safety valve body (71).

6. The brewing structure, as recited in claim 5, wherein the bottom piercing mechanism (6) comprises a bottom piercing tube (61) and a piercing tube spring (62); wherein the piercing tube spring (62) is mounted in the water passage (2*a*), the bottom piercing tube (61) is placed at a top end of the piercing tube spring (62); a piercing rubber ring (56) is placed on the top piercing tube (55) for sealing around a pierced hole of the coffee capsule (A) when the top piercing tube (55) pierces through the coffee capsule (A).

7. The brewing structure, as recited in claim 6, wherein the lower frame (121) forms a longitudinal assembly chamber; both the pump (3) and the heater (4) are mounted in the longitudinal assembly chamber; a check valve (Z) is provided in a communication space between the water tank (1*a*) and the pump (3) for preventing the brewing water from flowing backwards; the computer board (8) is mounted in a horizontal assembly chamber between the lower lid (13) and the bottom holder (122); a power cable of the computer board (8) extends outwards through a rear end of the lower body (12); a temperature controller (41) communicating with the computer board (8) is mounted on the heater (4) for feeding back and adjusting a heating temperature of the heater (4); the computer board (8) programs the heating temperature of the heater (4) and a brewing water amount of the pump (3).

8. The brewing structure, as recited in claim 7, wherein a bottom water level controller (Q) is provided in the water tank (1*a*) for stopping the heater (4) when a water level in the water tank (1*a*) is lower than a pre-set value; an electronic signal of the bottom water level controller (Q) feeds back water level information of the water tank (1*a*) to the computer board (8); a buzzer (M) is provided on the upper lid (14) for indicating when coffee brewing is completed or the water level is lower than the pre-set value; a lid button (N), comprising a button locker (N1) and a locker spring (N2), is mounted on the upper lid (14).

9. The brewing structure, as recited in claim 8, wherein the control buttons (91) comprises a start/stop button, a function button, and an adjust button which comprises an adding button and a decreasing button; wherein the function button switches between a water output adjusting function and a water temperature adjusting function, the adjust button adjusts the brewing water amount outputted by the pump (3) for each cup of coffee under the water output adjusting function by changing control parameters of the computer board (8) according to a coffee powder amount in the coffee capsule (A); the adjust button adjusts a water output temperature of the heater (4) under the water temperature adjusting function through the computer board (8).

10. The brewing structure, as recited in claim 8, wherein the control panel (9) is mounted in a top lid chamber (14*a*), whose opening faces upwards, of the upper lid (14); a heat isolator is mounted under the control panel (9); a sticker (15) with button function indicators is placed on the top lid chamber (14*a*) for corresponding to the control panel (9); a power indicator (D) is mounted in the upper lid (14).

* * * * *